Figure 1:
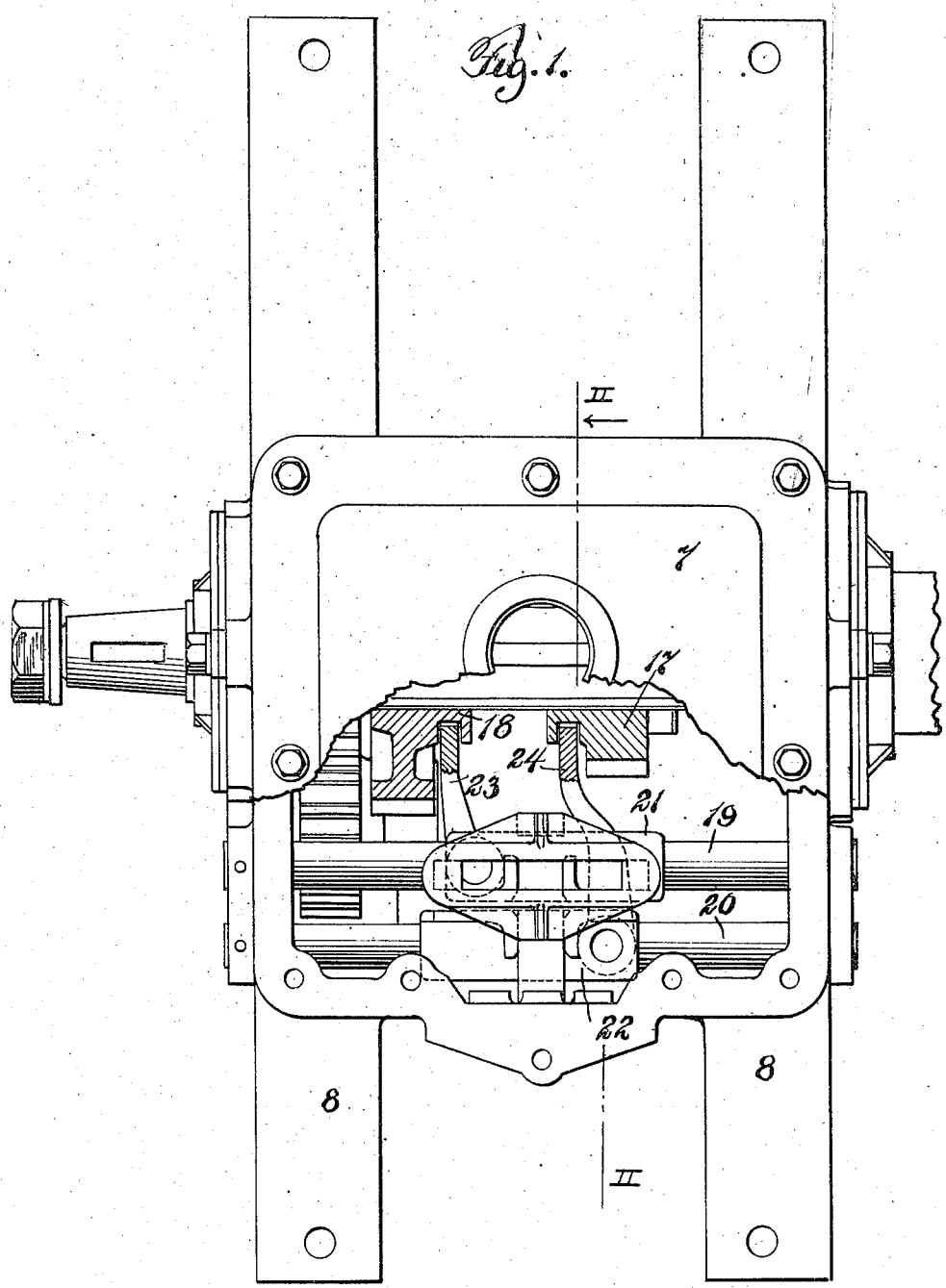

M. L. JENKINS.
TRANSMISSION MECHANISM.
APPLICATION FILED AUG. 13, 1910.

984,565.

Patented Feb. 21, 1911.

3 SHEETS—SHEET 1.

WITNESSES:
Harvey L. Lechner
Julian H. Kendig

INVENTOR
Merrill L. Jenkins
by atty
Paul Synnestvedt

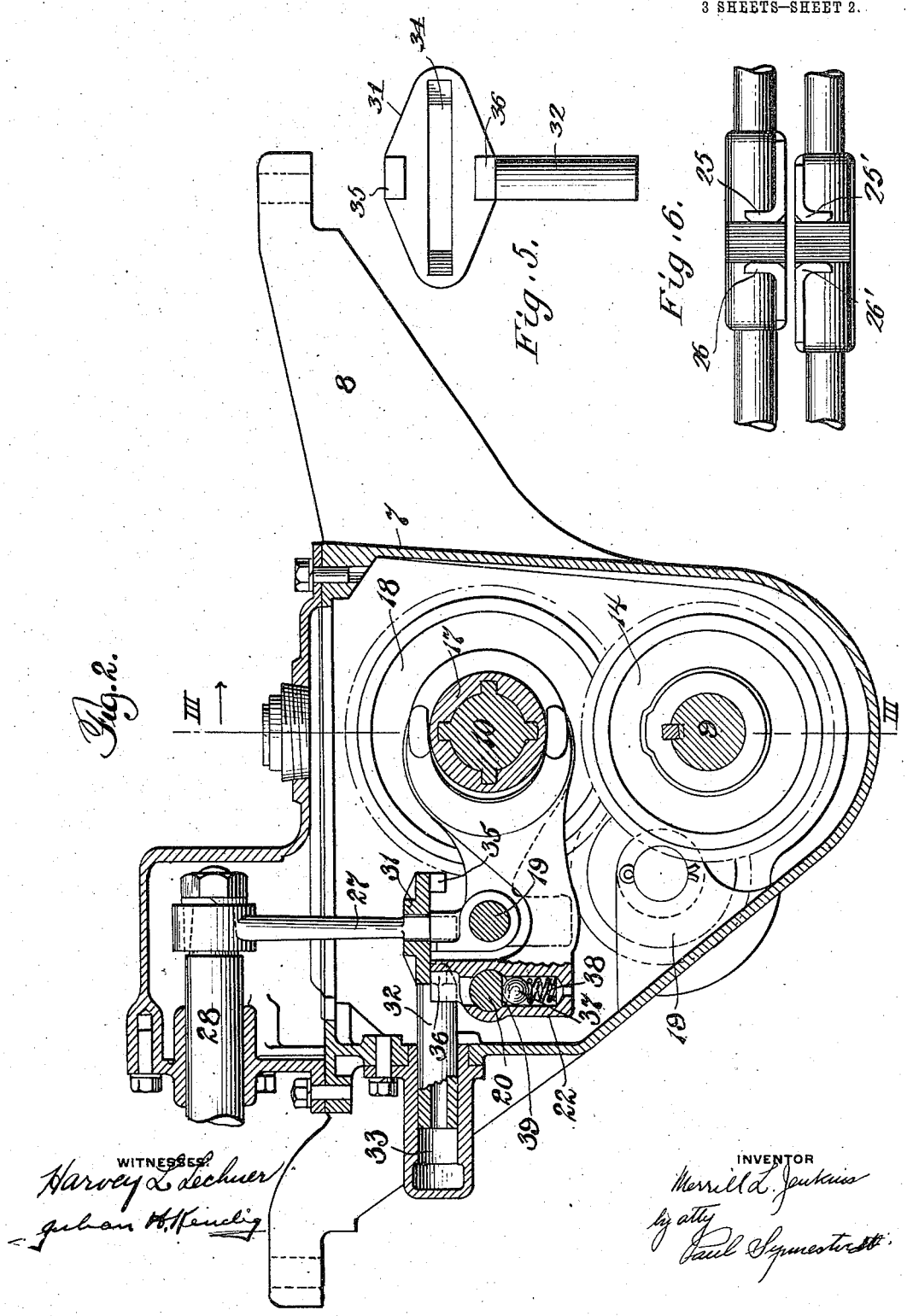

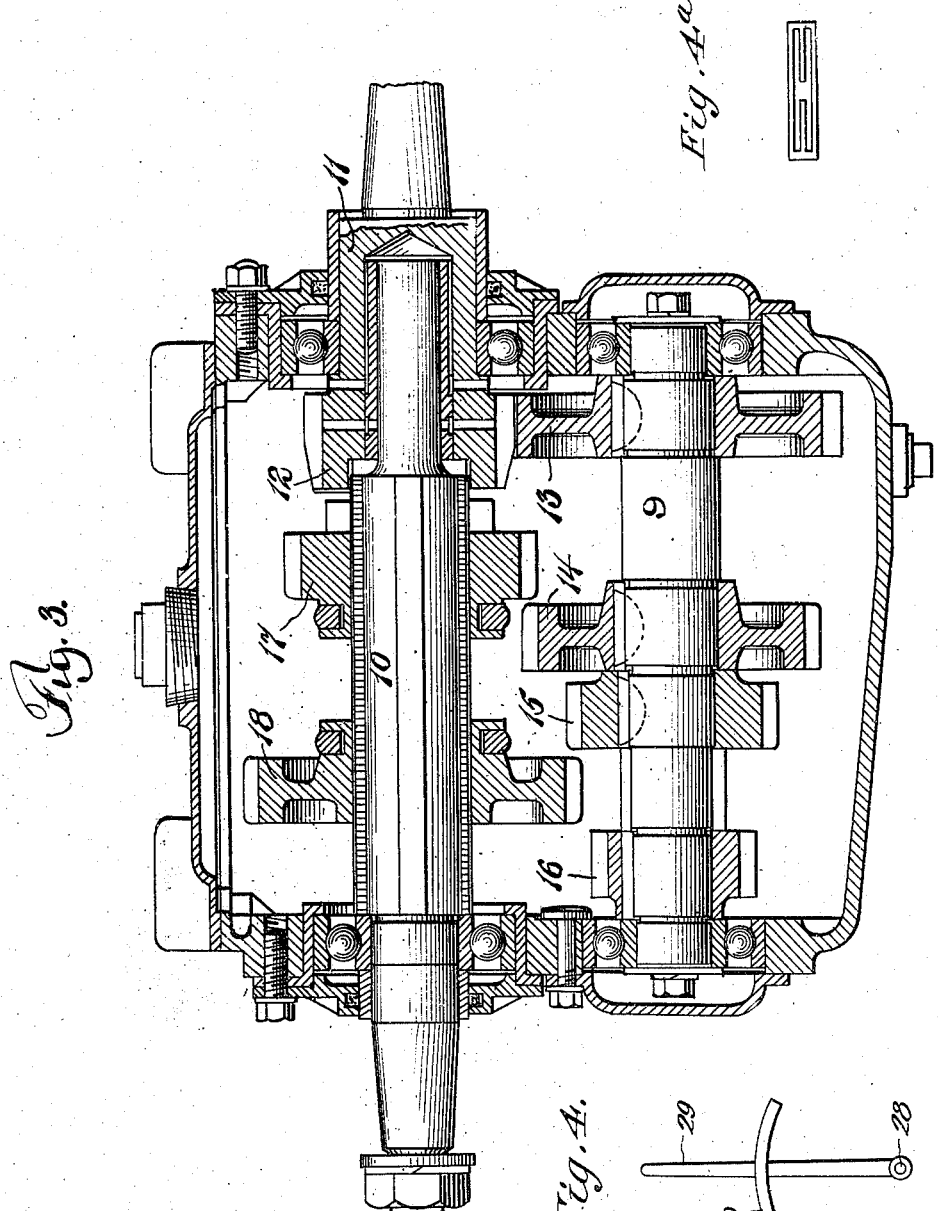

UNITED STATES PATENT OFFICE.

MERRILL L. JENKINS, OF HARVEY, ILLINOIS, ASSIGNOR TO THE BUDA COMPANY, OF CHICAGO, ILLINOIS, A CORPORATION OF ILLINOIS.

TRANSMISSION MECHANISM.

984,565.   Specification of Letters Patent.   Patented Feb. 21, 1911.

Application filed August 13, 1910. Serial No. 577,057.

*To all whom it may concern:*

Be it known that I, MERRILL L. JENKINS, a citizen of the United States, residing at Harvey, in the county of Cook and State of Illinois, have invented certain new and useful Improvements in Transmission Mechanism, of which the following is a specification.

My invention has relation to transmission mechanism for motor vehicles, and particularly to the means for locking the mechanism employed in shifting the various speed gears of automobile drives. It has for its primary objects; the provision of an improved transmission mechanism of simple construction; and the provision of improved interlocking means whereby certain of the gears are positively held against movement while others are in driving engagement or being shifted into engagement. These and such other objects as may hereinafter appear or are incidental to my invention, I attain by means of a construction illustrated in preferred form in the accompanying drawings which form a part of this specification. Of the drawings, Figure 1 is a plan view of a transmission mechanism with a portion of the casing broken away to more clearly show the parts, Fig. 2 is a section of Fig. 1 on the line II—II, Fig. 3 is a section of Fig. 2 on the line III—III, Fig. 4 is a side elevation of the shifting lever and quadrant employed, Fig. 4ª is a plan view of the quadrant, and Figs. 5 and 6 are views of details employed in carrying out the invention.

In general my invention is intended to provide an improved means for positively locking the idle gears of a transmission mechanism against movement, thereby avoiding accident and breakage, such for example as stripping of the gears.

Referring to the drawings and particularly Figures 1 and 2, it will be seen that I have provided the usual casing 7 having the supporting straps 8 extending therefrom and adapted to be secured to the frame of the car. Mounted in the casing are two shafts—, the driving shaft 9 and the driven shaft 10, a driving connection (not shown) extending from the latter to the rear axle. The driving shaft 9 is driven from the motor by the hollow shaft 11, and gears 12 and 13. The driven shaft is mounted at one end in the casing and journaled at the other end in the hollow shaft 11. Mounted on the driving shaft 9 are the gears 14, 15 and 16, the former being for the forward drives and the latter for the reverse drive. The driven shaft 10 is provided with longitudinally extending ribs fitting grooved gears 17 and 18 shiftably mounted on the shaft and adapted to be moved into and out of engagement with the driving gears 14, 15 and 16. In so far as explained the mechanism operates in the usual manner, the driven shaft 10 being idle when the parts are in position indicated in Figure 2, and being turned by the driving shaft when either of the gears 17 and 18 is being shifted into engagement with the gears 14 or 15, or when the gear 18 is shifted into engagement with the reversing pinion 19 (see Figure 2).

Referring to the means employed in shifting the gears into and out of engagement, particular attention is called to Figures 1, 2, 4, 5 and 6. Mounted in the casing 7 parallel the shafts 9 and 10 are two rods 19 and 20 having slidably mounted sleeves 21 and 22. The sleeve 21 is provided with an extension 23 and the sleeve 22 with an extension 24. The extension 23 engages the gear 18 and the extension 24 engages the gear 17. The sleeves are provided with sets of opposed shoulders 25 and 26 and 25', and 26', and the end of a shifting rod 27 is adapted to lie between the shoulders of either sleeve. The rod 27 is secured to the end of the shaft 28 operated by the usual hand shifting lever 29 working in an H quadrant 30 (see Figure 4). By the arrangement just described the shifting rod can be moved in between either set of shoulders and will move the corresponding sleeve and gear shifter when the shaft 28 is rotated by the movement of the lever 29, the gear shifter moving its gear into or out of engagement with the driving gears as the case may be.

Referring now to my improved interlocking mechanism it will be seen that I have provided a plate 31 having a stem or piston 32 working in the cylinder 33. The plate lies immediately above the sleeves 21 and 22 and has a longitudinally extending slot 34 through which the end of the shifting rod 27 is adapted to project and engage the sets of shoulders. When the shifting rod is moved in and out the plate is moved with it, and when the rod is rocked to shift the gear it moves in the slot 34. The plate 31 has two downwardly projecting lugs 35 and 36 which are adapted to move in between the opposing shoulders and are so spaced that when the rod is moved to engage one set of shoulders on one of the sleeves, one of the lugs will engage the other set on the other sleeve, and vice versa. This is clearly seen on inspection of Figure 2. By this construction one gear shifter and its gear are positively held in locked position while the other shifter and gear are in driving engagement or being moved into driving engagement. Stripping of the gears and other breakages are thus avoided. It is to be further observed that the idle parts are held in such locked position until the other parts are moved into middle or idle position. The parts are normally held in middle or idle position when the car is at rest by means of the balls 37 held by springs 38 into engagement with the notches 39 cut into the rods 19 and 20.

It will readily be seen that my construction is simple and positive in operation, and that the parts are not liable to get out of order and are easily assembled.

Other advantages will present themselves to those skilled in the art.

Having thus described my invention and illustrated its use what I claim as new and desire to secure by Letters Patent is the following:—

1. In combination in shifting gear mechanism, a plurality of shiftable gears, a plurality of guide rods, shiftable sleeves thereon for operating the gears, a pivoted shifting rod movable laterally with respect to its plane of pivotal movement and adapted to engage any one of the sleeves depending upon the lateral position of the rod, and locking means embracing the said rod and movable laterally therewith, but permitting swinging movement of the rod to shift the said sleeves, the locking means being arranged to engage and lock in position all of the gears except the one engaged by the shifting rod.

2. In combination in shifting gear mechanism, a plurality of shiftable gears, a plurality of guide rods arranged parallel to the line of movement of the gears and each provided with a shifting sleeve engaging a shiftable gear, an operating shaft slidably mounted and extending transversely of the guide rods, a shifting rod carried thereby and adapted to operatively engage any one of the sleeves depending upon the position of the operating shaft, and locking means embracing the said rod and movable laterally therewith, but permitting swinging movement of the rod to shift the said sleeves, the locking means being arranged to engage and lock in position all of the gears except the one engaged by the shifting rod.

3. In a transmission mechanism the combination with a casing, a driving and a driven shaft mounted in the casing, a plurality of driving gears mounted on the driving shaft, and a plurality of driven gears shiftably mounted on the driven shaft; of a shifting and locking means comprising in combination, a pair of rods mounted in the casing substantially parallel the driving and driven shafts, shifting sleeves slidably mounted on the said rods for engaging the driven gears and each provided with a set of opposing shoulders, a plate mounted in the casing adjacent the sleeves for movement transverse the said rods and provided with a slot and with abutments spaced so that when one is in engagement with one set of shoulders the other abutment will free the other set, a shifting rod adapted to project through the slot and engage either set of shoulders, and means for shifting and rocking the shaft.

In testimony whereof I have hereunto signed my name in the presence of the two subscribed witnesses.

MERRILL L. JENKINS.

Witnesses:
W. S. McDONALD,
L. C. CURL.